United States Patent
Zheng et al.

(10) Patent No.: US 10,516,526 B2
(45) Date of Patent: Dec. 24, 2019

(54) DATA TRANSMITTING METHOD, SERVER AND CLIENT

(71) Applicant: PAX COMPUTER TECHNOLOGY (SHENZHEN) CO., LTD., Shenzhen (CN)

(72) Inventors: Renchi Zheng, Shenzhen (CN); Lihong Xie, Shenzhen (CN); Jianghui Cao, Shenzhen (CN); Langming Tan, Shenzhen (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 781 days.

(21) Appl. No.: 15/107,069

(22) PCT Filed: Aug. 17, 2015

(86) PCT No.: PCT/CN2015/087263
§ 371 (c)(1),
(2) Date: Jun. 21, 2016

(87) PCT Pub. No.: WO2016/187970
PCT Pub. Date: Dec. 1, 2016

(65) Prior Publication Data
US 2017/0111166 A1    Apr. 20, 2017

(30) Foreign Application Priority Data

May 27, 2015    (CN) .......................... 2015 1 0278899

(51) Int. Cl.
*H04L 9/06* (2006.01)
*H04L 29/08* (2006.01)
(Continued)

(52) U.S. Cl.
CPC ............ *H04L 9/0643* (2013.01); *H04L 67/34* (2013.01); *G06Q 2220/00* (2013.01);
(Continued)

(58) Field of Classification Search
CPC ... H04L 9/0643; H04L 9/3239; H04L 9/3247; H04L 67/125; H04L 67/34; H04L 67/42;
(Continued)

(56) References Cited

U.S. PATENT DOCUMENTS 7,266,819 B2 * 9/2007 Helgesen ................ G06F 8/658
717/176
9,552,201 B2 * 1/2017 Hyndman ............... G06F 8/658
(Continued)

FOREIGN PATENT DOCUMENTS

| CN | 102236752 | 11/2011 |
|---|---|---|
| CN | 102833745 | 12/2012 |
| CN | 104539676 | 4/2015 |

*Primary Examiner* — Jayesh M Jhaveri
(74) *Attorney, Agent, or Firm* — Hamre, Schumann, Mueller & Larson, P.C.

(57) ABSTRACT

Embodiments of the invention disclose a data transmitting method, a server and a client. The method embodiments of the invention include: obtaining a client application list file uploaded by a client; determining whether a file in a object application list file exists in the client application list file, and determining whether a hash value sha2 of the file in the object application list file is identical to a hash value sha2 of a file in the client application list file; adding the non-existed file into an incremental file list when the file in the object application list file does not exist in the client application list file; adding a file which is not identical into the incremental file list when the hash value sha2 of the file in the object application list file is different from the hash value sha2 of the file in the client application list file; packaging and compressing the object application list file, a signature file of the object application list file and the file in the incremental file list to create an incremental upgrade package such that the client can upgrade the application package through the incremental upgrade package.

19 Claims, 10 Drawing Sheets

(51) Int. Cl.
    *G06F 8/658*     (2018.01)
    *G06F 9/445*     (2018.01)
    *H04L 9/32*     (2006.01)

(52) U.S. Cl.
    CPC .......... *H04L 9/3236* (2013.01); *H04L 9/3239* (2013.01); *H04L 9/3247* (2013.01)

(58) Field of Classification Search
    CPC . H04L 69/04; H04L 9/06; H04L 29/08; H04L 9/3236; G06F 8/658; G06F 8/65; G06F 9/445
    See application file for complete search history.

(56) References Cited

U.S. PATENT DOCUMENTS

| | | | |
|---|---|---|---|
| 2003/0097433 A1 | 5/2003 | Park et al. | |
| 2004/0215755 A1* | 10/2004 | O'Neill | G06F 8/654 709/223 |
| 2005/0132179 A1* | 6/2005 | Glaum | G06F 8/658 713/1 |
| 2006/0130037 A1* | 6/2006 | Mackay | G06F 8/658 717/168 |
| 2010/0095289 A1* | 4/2010 | Nguyen | G06F 8/658 717/169 |
| 2011/0296397 A1 | 12/2011 | Vidal et al. | |
| 2012/0084333 A1* | 4/2012 | Huang | H04L 29/0854 707/827 |
| 2014/0304697 A1* | 10/2014 | Lin | G06F 8/65 717/170 |
| 2015/0193618 A1* | 7/2015 | Takano | G06F 21/554 726/23 |
| 2016/0253170 A1* | 9/2016 | Fardig | G06F 8/658 717/170 |
| 2016/0291967 A1* | 10/2016 | Badri | G06F 8/658 |
| 2017/0195459 A1* | 7/2017 | e Costa | H04L 67/34 |

* cited by examiner

DATA TRANSMITTING METHOD, SERVER AND CLIENT

FIELD OF THE INVENTION

The present application relates to the technical field of computers, especially to a data transmitting method, a server and a client used in POS terminals.

BACKGROUND OF THE INVENTION

A POS (point of sale) terminal is a multi-functional terminal. When the POS is installed in a specially-engaged commercial unit or an accepting site of credit cards and connected with a computer to form a network, it can achieve automatic electronic funds transfer. The POS terminal supports functions such as consumption, pre-authorization, balance enquiry, transfer, and so on, and is secure, convenient and reliable to use.

The POS terminal needs to update the application program timely during an application process, and while the application program is being updated, the security of the data transmission should be considered. Furthermore, some POS terminals only support MODEM (modulator-demodulator unit) communication, and the download speed is pretty low when the application program is being updated. Therefore, an optimized updating method is required to ensure secure data transmission and increase the updating speed of the application program at the same time under the condition of limited network resources.

SUMMARY OF THE INVENTION

Embodiments of the invention provide a data transmitting method, a server and a client which can ensure secure data transmission and increase the updating speed of the application program.

A first aspect of the invention provides a data transmitting method which includes:

by a server, obtaining a client application list file uploaded by a client wherein the client application list file includes a file in an application package of the client and hash information of the file;

by the server, determining whether a file in the object application list file exists in the client application list file, and determining whether a hash value of a file in the object application list file is identical to a hash value sha2 of the file in the client application list file;

by the server, when the file in the object application list file does not exist in the client application list file, adding the file in the object application list file that does not exist in the client application list file into an incremental file list;

by the server, when the hash value sha2 of the file in the object application list file is different from the hash value sha2 of the file in the client application list file, adding the file in the object application list file of which the hash value sha2 is different from the hash value sha2 of the file in the client application list file into the incremental file list;

by the server, packaging and compressing the object application list file, a signature file of the object application list file and the file in the incremental file list to create an incremental upgrade package, such that the client upgrades the application package using the incremental upgrade package.

A second aspect of the invention provides a data transmitting method which includes:

by the client, uploading a client application list file to the server; wherein, the client application list file includes a file in an application package of the client and hash information of the file;

by the client, obtaining an incremental upgrade package created by the server which packages and compresses the object application list file, the signature file of the object application list file, and the files in the incremental file list; wherein, the files in the incremental file list include: the file in the object application list file that does not exist in the client application list file, and/or the file in the object application list file of which the hash value sha2 is different from the hash value sha2 of the file in the client application list file;

by the client, upgrading the application package based on the obtained incremental upgrade package.

In combination with the second aspect of the invention, after the step of by the client, obtaining an incremental upgrade package created by the server which packages and compresses the object application list file, the signature file of the object application list file, and the files in the incremental file list, the first embodiment of the second aspect of the present invention further includes:

by the client, parsing and verifying the incremental upgrade package;

by the client, backing up the client application list file.

In combination with the first embodiment of the second aspect of the present invention, in a second embodiment of the second aspect of the present invention, the step of by the client, parsing and verifying the incremental upgrade package specifically includes:

by the client, decompressing the incremental upgrade package into a temporary upgrade dictionary;

by the client, obtaining the signature file of the object application list file, and verifying whether the signature file of the object application list file is legal or not; if not, stopping upgrading and deleting the temporary upgrade dictionary;

by the client, parse the object application list file, and verify whether the application name in the object application list file is matched; if not, stopping upgrading and deleting the temporary upgrade dictionary;

by the client, verifying whether the hash value sha2 of the file in the object application list file is identical to a hash value sha2 of the file in the client application list file or not; if not, stopping upgrading and deleting the temporary upgrade dictionary;

by the client, verifying whether the file in the object application list file exists in the incremental upgrade package, if not, stopping upgrading and deleting the temporary upgrade dictionary;

In combination with the first embodiment or the second embodiment of the second aspect of the present invention, in a third embodiment of the second aspect of the present invention, the step of by the client, backing up the client application list file specifically includes:

by the client, creating a temporary backup dictionary;

by the client, moving the file that exists in the client application list file but not in the object application list file into the temporary backup dictionary;

by the client, moving the file in the client application list file of which the hash value sha2 is different from the hash value sha2 of the file in the object application list file into the temporary backup dictionary;

by the client, moving the client application list file and the signature file of the client application list file into the temporary backup dictionary.

In combination with the third embodiment of the second aspect of the present invention, in a fourth embodiment of the second aspect of the present invention, the step of by the client, upgrading the application package based on the obtained incremental upgrade package specifically includes:

by the client, copying the file in the temporary upgrade dictionary into an application dictionary, and informing the server that the upgrading task has been finished;

by the client, deleting the temporary upgrade dictionary and the temporary backup dictionary.

In combination with the fourth embodiment of the second aspect of the present invention, before the step of by the client, deleting the temporary upgrade dictionary and the temporary backup dictionary, a fifth embodiment of the second aspect of the invention further includes:

when a copy error happens, by the client, recovering the original file from the temporary backup dictionary, deleting the temporary upgrade dictionary, and informing the server that the upgrading task has been failed.

A third aspect of the invention provides a server, which includes:

an obtaining unit configured to obtain a client application list file uploaded by the client, wherein the client application list file contains a file in the application package of the client and hash information of the file;

a decision unit configured to decide whether the file in the object application list file exists in the client application list file, and decide whether the hash value sha2 of the file in the object application list file is identical to a hash value sha2 of the file in the client application list file;

a first processing unit configured to add a file in the object application list file which does not exist in the client application list file into an incremental file list when the file in the object application list file does not exist in the client application list file;

a second processing unit configured to add a file in the object application list file of which the hash value sha2 is different from the hash value sha2 of the file in the client application list file into the incremental file list when the hash value sha2 of the file in the object application list file is different from the hash value sha2 of the file in the client application list file;

a compressing unit configured to package and compress the object application list file, a signature file of the object application list file and the file in the incremental file list to create an incremental upgrade package such that the client can upgrade the application package through the incremental upgrade package.

A fourth aspect of the invention provides a client, which includes:

an upload module configured to upload a client application list file to the server, wherein the client application list file includes a file in an application package of the client and hash information of the file;

an obtaining module configured to obtain an incremental upgrade package created by the server which packages and compresses the object application list file, the signature file of the object application list file, and the files in the incremental file list; wherein the files in the incremental file list include: the file in the object application list file which does not exist in the client application list file, and/or the file in the object application list file of which the hash value sha2 is different from the hash value sha2 of the file in the client application list file;

an upgrade module configured to upgrade the application package based on the obtained incremental upgrade package.

In combination with the fourth aspect of the invention, in a first embodiment of the invention, the client further includes:

a parse module configured to parse and verify the incremental upgrade package;

a backup module configured to back up the client application list file.

In combination with the first embodiment of the fourth aspect of the invention, in a second embodiment of the fourth aspect of the invention, the parse module specifically includes:

a decompressing sub-module configured to decompress the incremental upgrade package into a temporary upgrade dictionary;

a first verification sub-module configured to obtain the signature file of the object application list file, and verify whether the signature file of the object application list file is legal or not; if not, stopping upgrading and deleting the temporary upgrade dictionary;

a second verification sub-module configured to parse the object application list file, and verify whether the application name in the object application list file is matched; if not, stopping upgrading and deleting the temporary upgrade dictionary;

a third verification sub-module configured to verify whether the hash value sha2 of the file in the object application list file is identical to the hash value sha2 of the file in the client application list file or not; if not, stopping upgrading and deleting the temporary upgrade dictionary;

a fourth verification sub-module configured to verify whether the file in the object application list file exists in the incremental upgrade package, if not, stopping upgrading and deleting the temporary upgrade dictionary.

In combination with the first embodiment or the second embodiment of the fourth aspect of the invention, in a third embodiment of the fourth aspect of invention, the backup module specifically includes:

a creation sub-module configured to create a temporary backup dictionary;

a first move sub-module configured to move the file which exists in the client application list file but not in the object application list file into the temporary backup dictionary;

a second move sub-module configured to move the file which is in the client application list file and the hash value sha2 of the file is different from the hash value sha2 of the file in the object application list file into the temporary backup dictionary;

a third move sub-module configured to move the client application list file and the signature file of the client application list file into the temporary backup dictionary.

In combination with the third embodiment of the fourth aspect of the invention, in a fourth embodiment of the fourth aspect of invention, the upgrade module specifically includes:

a copy sub-module configured to copy the file in the temporary upgrade dictionary into an application dictionary;

a delete sub-module configured to delete the temporary upgrade dictionary and the temporary backup dictionary and inform the server that the upgrading task has been finished.

In combination with the fourth embodiment of the fourth aspect of the invention, in a fifth embodiment of the fourth aspect of invention, the upgrade module further includes:

a recovery module configured to recover the original file from the backup upgrade dictionary, delete the temporary upgrade dictionary, and inform the server that the upgrading task has been failed if an error happens when the copy sub-module copies.

As can be seen from the above technical solutions, the invention possesses the following advantages: by a server, obtaining a client application list file uploaded by a client; wherein the client application list file includes a file in an application package of the client and hash information of the file; by the server, determining whether the file in the object application list file exists in the client application list file, and determining whether the hash value sha2 of the file in the object application list file is identical to a hash value sha2 of the file in the client application list file; by the server, adding the file in the object application list file which does not exist in the client application list file into an incremental file list when the file in the object application list file does not exist in the client application list file; by the server, adding the file in the object application list file of which the hash value sha2 is different from the hash value sha2 of the file in the client application list file into the incremental file list when the hash value sha2 of the file in the object application list file is different from the hash value sha2 of the file in the client application list file; by the server, packaging and compressing the object application list file, a signature file of the object application list file and the file in the incremental file list to create an incremental upgrade package such that the client can upgrade the application package through the incremental upgrade package. The invention adopts more secure hash algorithm to avoid fabricating illegal files with identical hash values through hash attacks; and by packaging and compressing the file and executing signature verification for the application list file, avoids fabricating the application upgrade files; in this way, secure data transmission is ensured, and the updating speed of application programs is increased simultaneously.

DETAILED DESCRIPTION OF THE PREFERRED EMBODIMENT

The technical solutions of the embodiments of the present invention will be described clearly and completely hereinafter in combination with the figures of the embodiments of the present invention. Obviously, the embodiments described herein are merely some but not all embodiments of the present invention. Based on the embodiments of the present invention, all the other embodiments obtainable by those skilled in the art without paying creative works are all within the protection scope of the present invention.

It should be understood that, in the embodiments of the present invention, although terms "first", "second", and the like may be used to describe each user or terminal, the users or terminals should not be limited by the terms. These terms are merely used to differentiate the users or terminals from each other. For example, under the condition of no deviation from the protection scope of the invention, the first user can also be referred to as the second user, similarly, the second user can also be referred to as the first user; likewise, the second user can also be referred to as the third user, and so on, which is not limited by the embodiments of the present invention.

Figure 1:
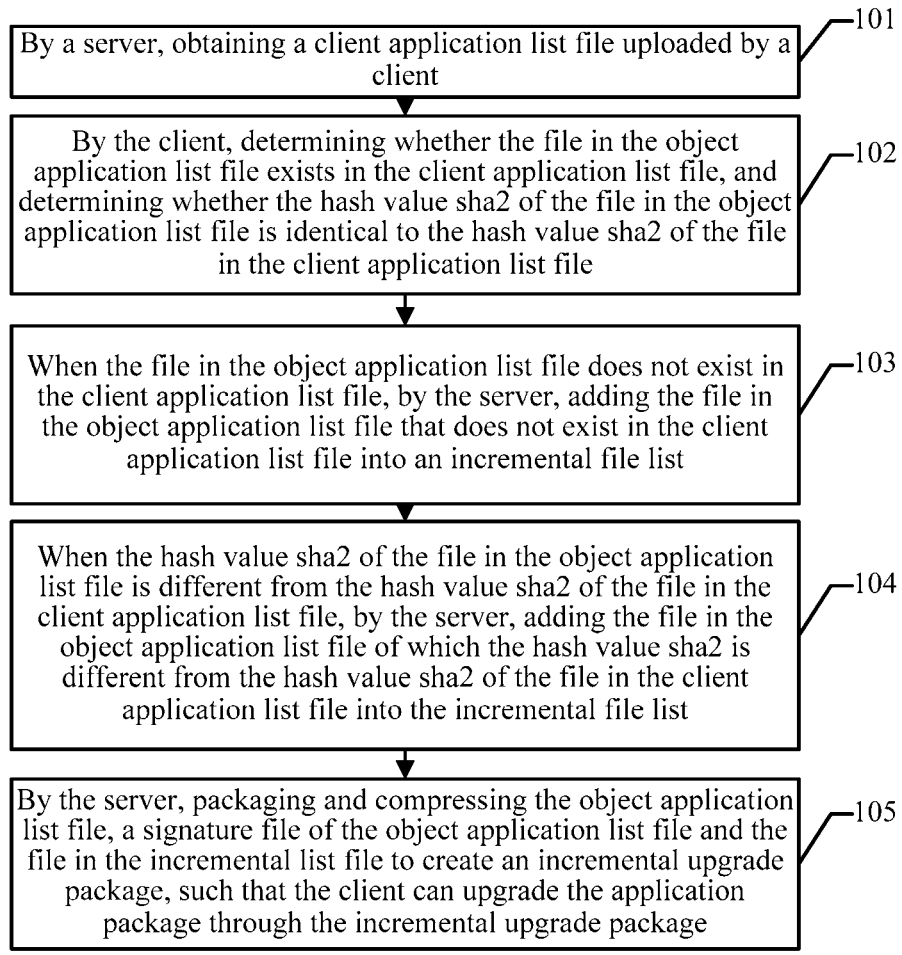
FIG. 1 is a flow diagram of one embodiment of a data transmitting method provided by the present invention.

Please refer to FIG. 1, an embodiment of the data transmitting method provided by the invention includes:

101. By a server, obtaining a client application list file uploaded by a client.

It should be noted that the server obtains a client application list file "manifest.xml", which is uploaded by the client; wherein, the client should also upload a terminal number to the server, and the server can inquiry an updating task of the terminal according to the terminal number; the client application list file includes a file in an application package of the client and hash information of the file; the type of the application list file is manifest.xml, which is a file to describe the file in the application package and hash information of the file. For example, an exemplified manifest.xml is as follows:

```
<?xml version="1.0" encoding="UTF-8"?>
<package type="application"
        name="PXRetailer"
        version="1.2.3"
        description="PAX Standard POS Application">
    <application display_name="PX Retailer" bin="./PXRetailer" />
    <files>
        <file                                               path="PXRetailer"
sha2="518338fddffebc29d12784c47637b0dfea8e7c312e9f6da6b864660dff494828" />
        <file                                               path="conf/config.ini"
sha2="a66c5acf30085e4e7b9c6976df729763c46cf23a769f7c2baf54314590594026" />
        <file                                               path="res/LaneClosed.pb"
sha2="2d826655e015d1a9e4bbe71ae3de072695c1c55f9da4f19a214f303667e4532b" />
        <file                                               path="res/SplashScreen.pb"
sha2="6b85f1aa528c0923ed933580f80e788cfde3951ce1392c9d983d6609c5b66174" />
    </files>
</package>.
```

102. By the client, determining whether the file in the object application list file exists in the client application list file, and determining whether the hash value sha2 of the file in the object application list file is identical to the hash value sha2 of the file in the client application list file.

It should be noted that, the server can firstly verify whether the name of the application is matched by parsing the manifest.xml file in the client; if not, "no application" is returned to the client and the connection of the client is cut off; if yes, then the further judgments are continuously performed. It can be understood that the object application list file is a file in the server required by the client during application upgrading; wherein sha2 is the hash value of the file. For example, "path" is a path of the file in the manifest.xml file entry, and sha2 is the hash value of the file.

103. When the file in the object application list file does not exist in the client application list file, by the server, adding the file in the object application list file that does not exist in the client application list file into an incremental file list.

It should be noted that the server traverses the list file in the object manifest.xml in an updating task; if the file does not exist in the client manifest.xml, the file will be added into the incremental file list.

104. When the hash value sha2 of the file in the object application list file is different from the hash value sha2 of the file in the client application list file, by the server, adding the file in the object application list file of which the hash value sha2 is different from the hash value sha2 of the file in the client application list file into the incremental file list.

It should be noted that the server traverses the file list in the object manifest.xml in an updating task, and adds the file of which the sha2 is different from the sha2 value in the client manifest.xml into the incremental file list.

105. by the server, packaging and compressing the object application list file, a signature file of the object application list file and the file in the incremental file list to create an incremental upgrade package, such that the client can upgrade the application package through the incremental upgrade package.

It should be noted that the server packages and compresses the object manifest.xml, an object manifest.xml.sig and the file in the incremental file list into an incremental upgrade package; in order to prevent the object application list manifest.xml file from being tampered, the incremental upgrade package further requires a signature file manifest.xml.sig of the object manifest.xml.

In the embodiment of the present invention, the server obtains the client application list file uploaded by the client; the client application list file includes a file in an application package of the client and hash information of the file; the server decides whether the file in the object application list file exists in the client application list file, and decides whether the hash value sha2 of the file in the object application list file is identical to hash value sha2 of the file in the client application list file; when the file in the object application list file does not exist in the client application list file, the server adds the file in the object application list file which does not exist in the client application list file into an incremental file list; when the hash value sha2 of the file in the object application list file is different from the hash value sha2 of the file in the client application list file, then the server adds the file in the object application list file of which the hash value sha2 is different from the hash value sha2 of the file in the client application list file into the incremental file list; the server packages and compresses the object application list file, a signature file of the object application list file and the file in the incremental file list to create an incremental upgrade package such that the client can upgrade an application package through the incremental upgrade package. The embodiment of the invention avoids fabricating illegal files with the identical hash value through hash attack by adopting more secure hash algorithm; and avoids fabricating the application upgrade file by packaging and compressing the file and signature verifying the application list file; thereby ensuring secure data transmission, at the same time, accelerating the update of application programs.

Figure 2:
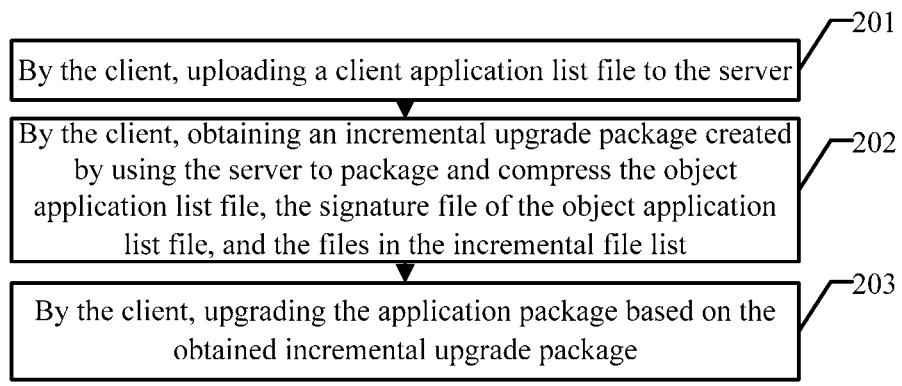
FIG. 2 is a flow diagram of another embodiment of the data transmitting method provided by the present invention.

Please refer to FIG. 2, another embodiment of the data transmitting method provided by the present invention includes:

201. By the client, uploading a client application list file to the server.

Wherein, the client application list file includes a file in an application package of the client and hash information of the file.

Refer to relevant description in step 101, which is not repeated here.

202. By the client, obtaining an incremental upgrade package created by using the server to package and compress the object application list file, the signature file of the object application list file, and the files in the incremental file list.

Wherein, the files in the incremental file list include: the file in the object application list file that does not exist in the client application list file, and/or the file in the object application list file of which the hash value sha2 is different from the hash value sha2 of the file in the client application list file.

Refer to relevant description in steps 102~105, which are not repeated here.

203. By the client, upgrading the application package based on the obtained incremental upgrade package.

The client upgrades the application package based on the application file in the incremental upgrade package.

In the embodiment of the invention, the client uploads a client application list file to the server; the client application list file includes a file in an application package of the client and hash information of the file; the client obtains the incremental upgrade package created by using the server to package and compress the object application list file, the signature file of the object application list file, and the files in the incremental file list; wherein the files in the incremental file list include: the file in the object application list file that does not exist in the client application list file, and/or the file in the object application list file of which the hash value sha2 is different from the hash value sha2 of the file in the client application list file; the client upgrades the application package based on the obtained incremental upgrade package. By adopting more secure hash algorithm, the embodiment of the invention avoids fabricating an illegal files with the identical hash value through hash attack; and avoids fabricating the application upgrade file by packaging and compressing the file and signature verifying the application list file; thereby ensuring secure data transmission, at the same time, accelerating the update of application programs.

Figure 3:
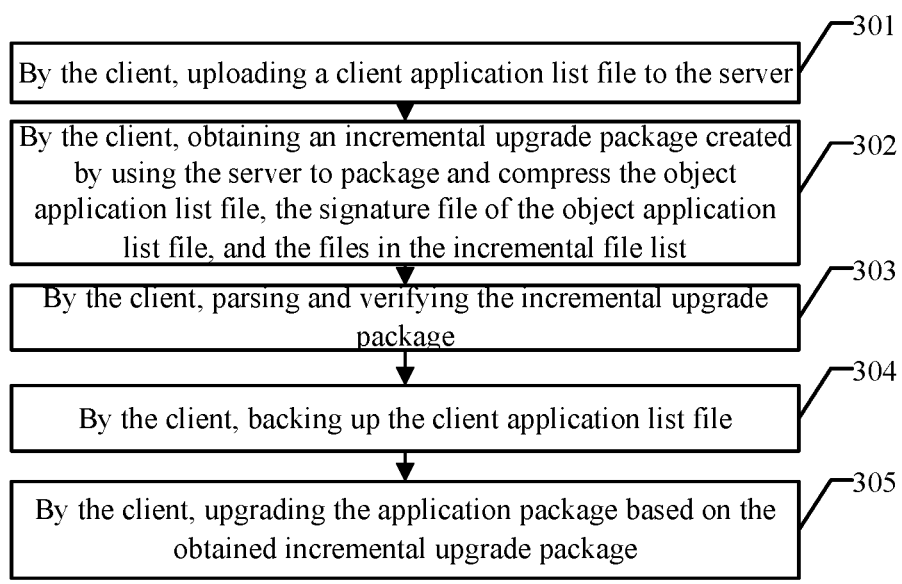
FIG. 3 is a flow diagram of another embodiment of the data transmitting method provided by the present invention.

Please refer to FIG. 3, another embodiment of the data transmitting method provided by the present invention includes:

301. By the client, uploading a client application list file to the server.

Wherein, the client application list file includes a file in an application package of the client and hash information of the file.

Refer to relevant description in step 101, which are not repeated here.

302. By the client, obtaining an incremental upgrade package created by using the server to package and compress the object application list file, the signature file of the object application list file, and the files in the incremental file list.

Wherein, the files in the incremental file list include: the file in the object application list file that does not exist in the client application list file, and/or the file in the object application list file of which the hash value sha2 is different from the hash value sha2 of the file in the client application list file.

Refer to relevant description in steps 102~105, which are not repeated here.

303. By the client, parsing and verifying the incremental upgrade package;

The client downloads and decompresses the incremental upgrade package, and verifies the incremental upgrade package.

304. By the client, backing up the client application list file;

The client creates a backup dictionary, and backs up the client manifest.xml.

305. By the client, upgrading the application package based on the obtained incremental upgrade package.

The client upgrades the application package using the application file in the incremental upgrade package.

In the embodiment of the present invention, the client parses and verifies the incremental upgrade package, and backs up the client application list file, thereby avoiding attack from artificial illegal documents and improving the security and reliability for upgrading an application program.

Figure 4:
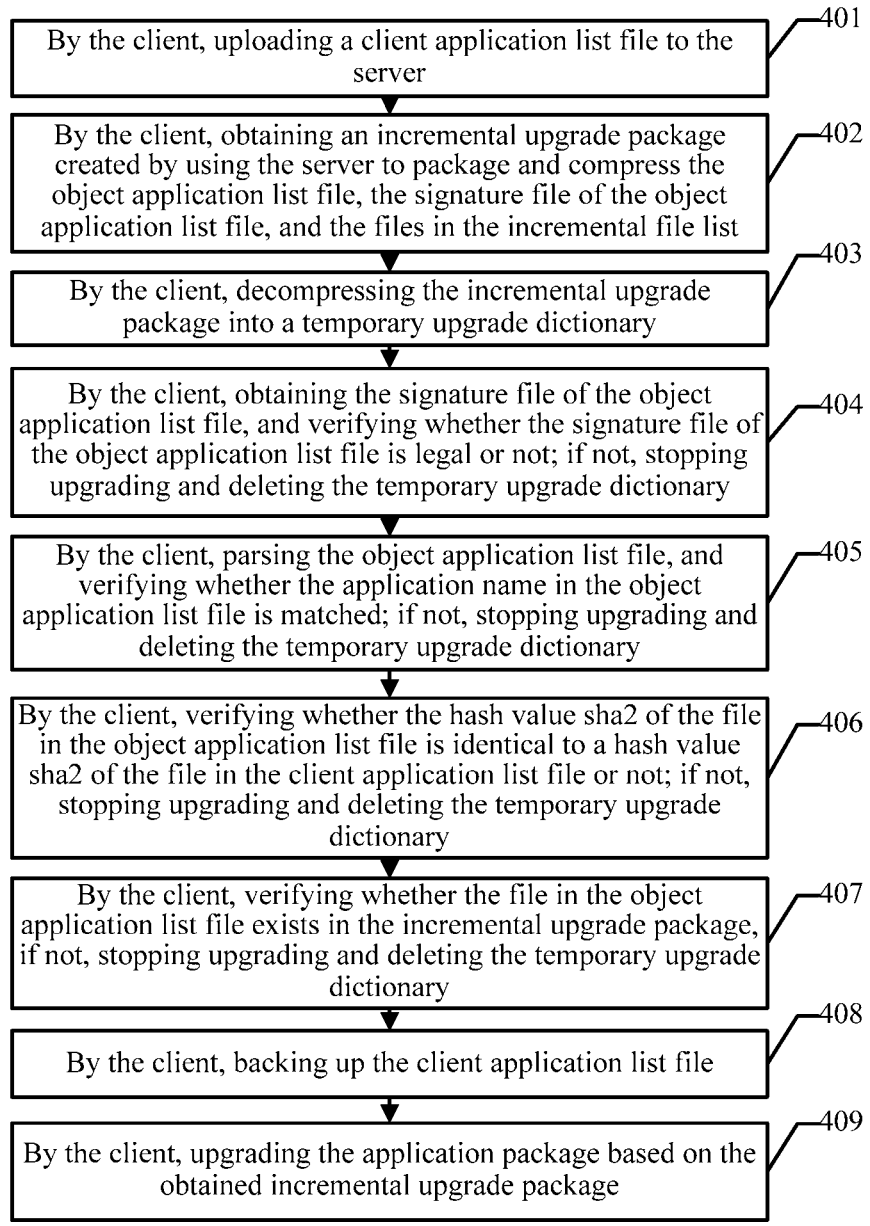
FIG. 4 is a flow diagram of another embodiment of the data transmitting method provided by the present invention.

Please refer to FIG. 4, another embodiment of the data transmitting method provided by the present invention includes:

401. By the client, uploading a client application list file to the server;

Wherein, the client application list file includes a file in an application package of the client and hash information of the file.

Refer to relevant description in step 101, which are not repeated here.

402. By the client, obtaining an incremental upgrade package created by using the server to package and compress the object application list file, the signature file of the object application list file, and the files in the incremental file list.

Wherein, the files in the incremental file list include: the file in the object application list file that does not exist in the client application list file, and/or the file in the object application list file of which the hash value sha2 is different from the hash value sha2 of the file in the client application list file.

Refer to relevant description in steps 102~105, which are not repeated here.

403. By the client, decompressing the incremental upgrade package into a temporary upgrade dictionary;

The client downloads the incremental upgrade package and decompresses the incremental upgrade package into a temporary upgrade dictionary.

404. By the client, obtaining the signature file of the object application list file, and verifying whether the signature file of the object application list file is legal or not; if not, stopping upgrading and deleting the temporary upgrade dictionary;

The client verifies whether the object manifest.xml is legal or not according to the object manifest.xml, if not, the upgrading is stopped and the temporary upgrade dictionary is deleted.

405. By the client, parsing the object application list file, and verifying whether the application name in the object application list file is matched; if not, stopping upgrading and deleting the temporary upgrade dictionary;

The client parses the object manifest.xml, and verifies whether the application name is matched; if not, the upgrading is stopped and the temporary upgrade dictionary is deleted.

406. By the client, verifying whether the hash value sha2 of the file in the object application list file is identical to a hash value sha2 of the file in the client application list file or not; if not, stopping upgrading and deleting the temporary upgrade dictionary;

The client traverses the file list in the object manifest.xml, if the sha2 value of the file is different from the client, the client verifies whether the object file is correct or not through sha2 algorithm. If the sha2 value is not identical, the upgrading is stopped and the temporary upgrade dictionary is deleted.

407. By the client, verifying whether the file in the object application list file exists in the incremental upgrade package, if not, stopping upgrading and deleting the temporary upgrade dictionary;

The client traverses the list file in the object manifest.xml, if the file in the object manifest.xml does not exist in the incremental upgrade package, and does not exist in the client locality either or is different from the sha2 value of the file in the client locality, the upgrading is stopped and the temporary upgrade dictionary is deleted.

408. By the client, backing up the client application list file;

The client creates a backup dictionary, and backs up the client manifest.xml.

409. By the client, upgrading the application package based on the obtained incremental upgrade package.

The client upgrades the application package based on the application file in the incremental upgrade package.

In the embodiment of the present invention, the client decompresses the incremental upgrade package into a temporary upgrade dictionary; the client obtains the signature file of the object application list file, and verifies whether the signature file of the object application list file is legal or not; if not, the upgrading is stopped and the temporary upgrade dictionary is deleted; the client parses the object application list file, and verifies whether the application name in the object application list file is matched; if not, the upgrading is stopped and the temporary upgrade dictionary is deleted; the client verifies whether the hash value sha2 of the file in the object application list file is identical to the hash value sha2 of the file in the client application list file or not; if not, the upgrading is stopped and the temporary upgrade dictionary is deleted; the client verifies whether the file in the object application list file exists in the incremental upgrade package, if not, the upgrading is stopped and the temporary upgrade dictionary is deleted; in this way, fabricating illegal documents with identical hash values by hash attacks is prevented and the security and reliability for upgrading an application program are improved.

Figure 5:
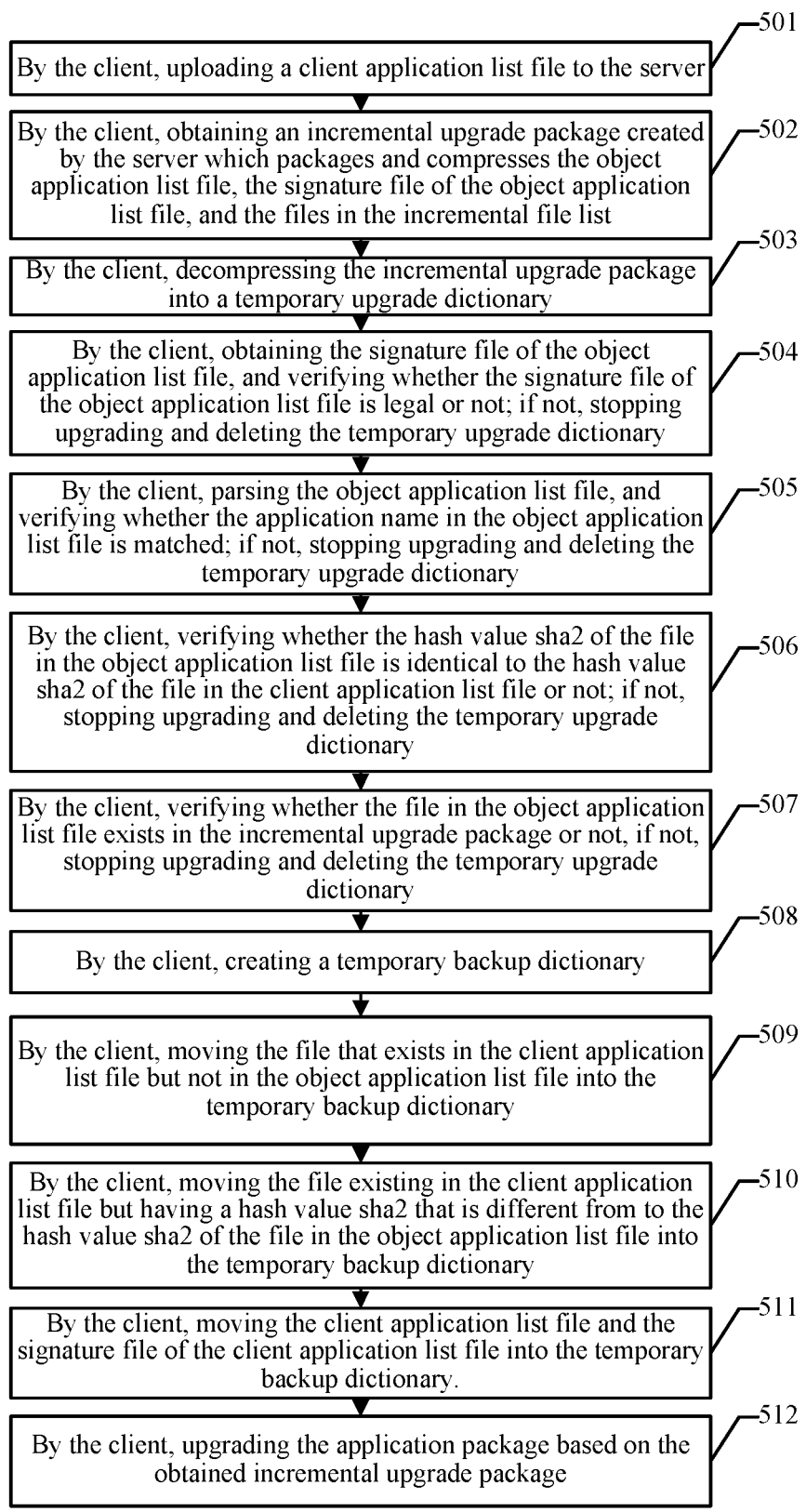
FIG. 5 is a flow diagram of another embodiment of the data transmitting method provided by the present invention.

Please refer to FIG. 5, the data transmitting method provided by the invention according to another embodiment includes:

501. By the client, uploading a client application list file to the server;

Wherein, the client application list file includes a file in an application package of the client and hash information of the file;

502. By the client, obtaining an incremental upgrade package created by the server which packages and compresses the object application list file, the signature file of the object application list file, and the files in the incremental file list;

Wherein, the files in the incremental file list include: the file in the object application list file which does not exist in the client application list file, and/or the file in the object application list file of which the hash value sha2 is different from the hash value sha2 of the file in the client application list file;

503. By the client, decompressing the incremental upgrade package into a temporary upgrade dictionary;

504. By the client, obtaining the signature file of the object application list file, and verifying whether the signature file of the object application list file is legal or not; if not, stopping upgrading and deleting the temporary upgrade dictionary;

505. By the client, parsing the object application list file, and verifying whether the application name in the object application list file is matched; if not, stopping upgrading and deleting the temporary upgrade dictionary;

506. By the client, verifying whether the hash value sha2 of the file in the object application list file is identical to the hash value sha2 of the file in the client application list file or not; if not, stopping upgrading and deleting the temporary upgrade dictionary;

507. By the client, verifying whether the file in the object application list file exists in the incremental upgrade package or not, if not, stopping upgrading and deleting the temporary upgrade dictionary;

It is to be understood that the relevant description on the steps 401~407 can be correspondingly referred to by the steps 501-507, which would not be further described.

508. By the client, creating a temporary backup dictionary.

Before backing up the required file, the client needs to create a temporary backup dictionary.

509. By the client, moving the file that exists in the client application list file but not in the object application list file into the temporary backup dictionary.

The client moves the file that exists merely in the client manifest.xml but not in the object manifest.xml to the temporary backup dictionary.

510. By the client, moving the file existing in the client application list file but having a hash value sha2 that is different from to the hash value sha2 of the file in the object application list file into the temporary backup dictionary;

The client moves the file existing in the client manifest.xml but having a hash value sha2 that is different from the hash value sha2 of the file in the object manifest.xml into the temporary backup dictionary.

511. By the client, moving the client application list file and the signature file of the client application list file into the temporary backup dictionary.

The client moves the client manifest.xml, the client manifest.xml.sig into the temporary backup dictionary.

512. By the client, upgrading the application package based on the obtained incremental upgrade package.

The client upgrades the application package based on the application file in the incremental upgrade package.

In the embodiment of the present invention, the client creates a temporary backup dictionary; the client moves the file that exists in the client application list file but not in the object application list file into the temporary backup dictionary; the client moves the file existing in the client application list file but having a hash value sha2 that is different from the hash value sha2 of the file in the object application list file into the temporary backup dictionary; the client moves the client application list file, the signature file of the client application list file into the temporary backup dictionary, so as to avoid file loss due to following upgrade errors, and thereby improve the security of the application upgrade.

Figure 6:
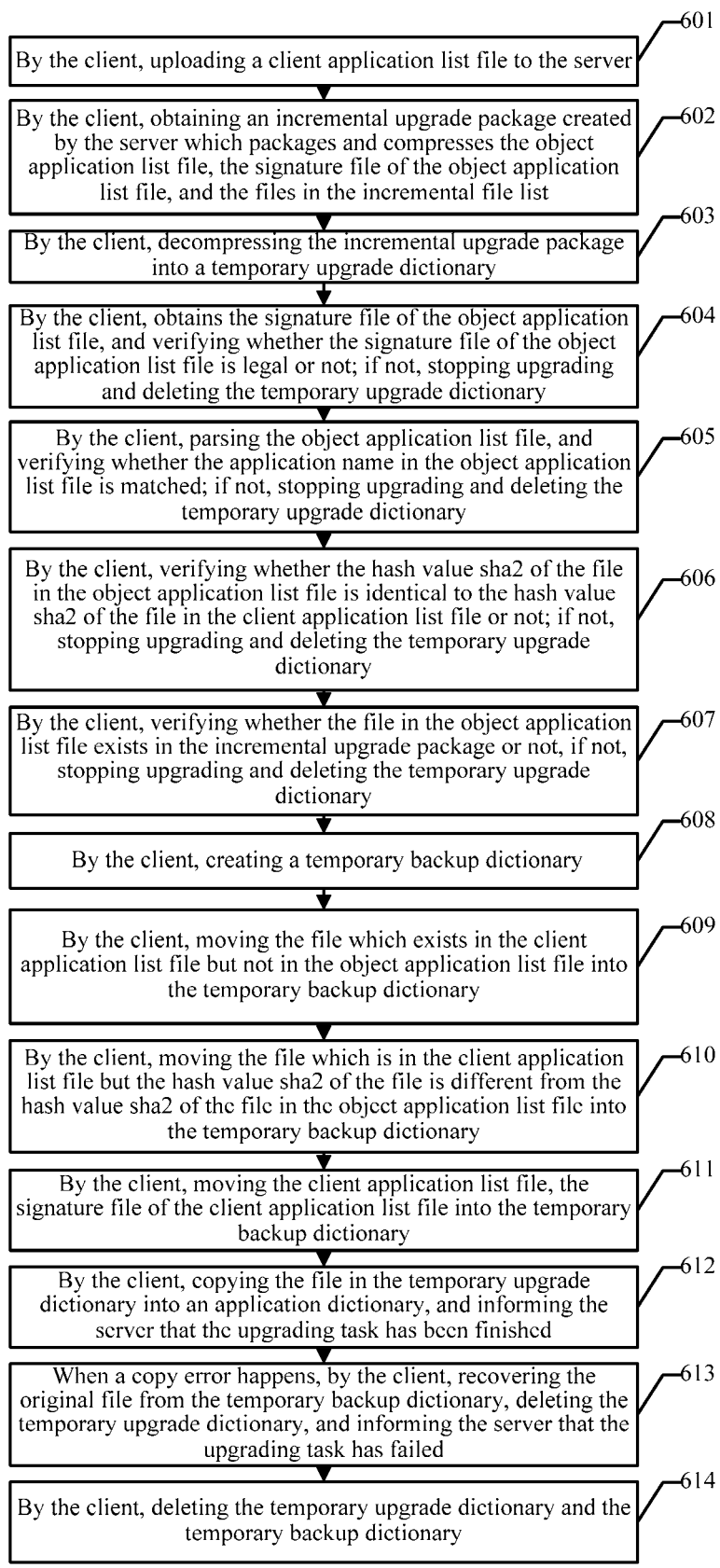
FIG. 6 is a flow diagram of another embodiment of the data transmitting method provided by the present invention.

Refer to FIG. 6, the data transmitting method provided by the invention according to another embodiment includes:

601. By the client, uploading a client application list file to the server;

Wherein, the client application list file includes a file in an application package of the client and hash information of the file;

602. By the client, obtaining an incremental upgrade package created by the server which packages and compresses the object application list file, the signature file of the object application list file, and the files in the incremental file list;

Wherein, the files in the incremental file list include: the file in the object application list file which does not exist in the client application list file, and/or the file in the object application list file of which the hash value sha2 is different from the hash value sha2 of the file in the client application list file;

603. By the client, decompressing the incremental upgrade package into a temporary upgrade dictionary;

604. By the client, obtains the signature file of the object application list file, and verifying whether the signature file of the object application list file is legal or not; if not, stopping upgrading and deleting the temporary upgrade dictionary;

605. By the client, parsing the object application list file, and verifying whether the application name in the object application list file is matched; if not, stopping upgrading and deleting the temporary upgrade dictionary;

606. By the client, verifying whether the hash value sha2 of the file in the object application list file is identical to the hash value sha2 of the file in the client application list file or not; if not, stopping upgrading and deleting the temporary upgrade dictionary;

607. By the client, verifying whether the file in the object application list file exists in the incremental upgrade package or not, if not, stopping upgrading and deleting the temporary upgrade dictionary;

608. By the client, creating a temporary backup dictionary;

609. By the client, moving the file which exists in the client application list file but not in the object application list file into the temporary backup dictionary;

610. By the client, moving the file which is in the client application list file but the hash value sha2 of the file is different from the hash value sha2 of the file in the object application list file into the temporary backup dictionary;

611. By the client, moving the client application list file, the signature file of the client application list file into the temporary backup dictionary;

It is to be understood that the relevant description on the steps 501-511 can be correspondingly referred to by the steps 601~611, which would not be further described.

612. By the client, copying the file in the temporary upgrade dictionary into an application dictionary, and informing the server that the upgrading task has been finished;

The client copies the object manifest.xml, object manifest.xml.sig and other incremental files in the temporary upgrade dictionary into the application dictionary, and informs the server that the upgrading task has been finished.

613. When a copy error happens, by the client, recovering the original file from the temporary backup dictionary, deleting the temporary upgrade dictionary, and informing the server that the upgrading task has failed;

If an error happens during the copy process, the client recovers the file in the application from the temporary backup dictionary, deletes the temporary upgrade dictionary, and informs the server that the upgrading task of the server has failed.

614. By the client, deleting the temporary upgrade dictionary and the temporary backup dictionary.

After the upgrading is finished, the temporary upgrade dictionary and the temporary backup dictionary are deleted.

In the embodiment of the present invention, the client copies the file in the temporary upgrade dictionary into an application dictionary, and informs the server that the upgrading task has been finished; if a copy error happens, the client recovers the original file from the temporary backup dictionary, deletes the temporary upgrade dictionary, and informs the server that the upgrading task has failed; the client deletes the temporary upgrade dictionary and the temporary backup dictionary, thereby improving the reliability of the upgrading of the application.

Figure 7:
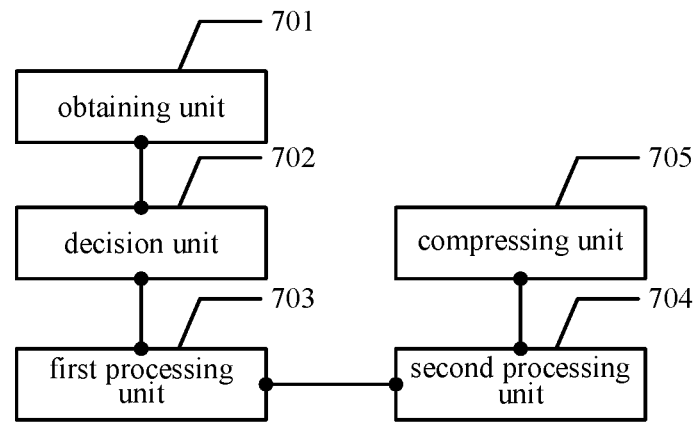
FIG. 7 is a structural schematic view of an embodiment of a server provided by the present invention.

The data transmitting methods of the present invention has been illustrated above, and the structure of the server and the client will be illustrated hereafter in an apparatus perspective. Please refer to FIG. 7, one embodiment of the server provided by the invention includes:

an obtaining unit 701 configured to obtain a client application list file uploaded by the client, wherein the client application list file contains a file in the application package of the client and hash information of the file;

a decision unit 702 configured to decide whether the file in the object application list file exists in the client application list file, and decide whether the hash value sha2 of the file in the object application list file is identical to the hash value sha2 of the file in the client application list file;

a first processing unit 703 configured to add a file in the object application list file which does not exist in the client application list file into an incremental file list when the file in the object application list file does not exist in the client application list file;

a second processing unit 704 configured to add a file in the object application list file of which the hash value sha2 is different from the hash value sha2 of the file in the client application list file into the incremental file list when the hash value sha2 of the file in the object application list file is different from the hash value sha2 of the file in the client application list file;

a compressing unit 705 configured to package and compress the object application list file, a signature file of the object application list file and the file in the incremental file list to create an incremental upgrade package such that the client can upgrade the application package through the incremental upgrade package.

In the embodiment of the invention, the obtaining unit 701 obtains a client application list file uploaded by the client, wherein the client application list file contains a file in the application package of the client and hash information of the file; the decision unit 702 decides whether the file in the object application list file exists in the client application list file, and decides whether the hash value sha2 of the file in the object application list file is identical to the hash value sha2 of the file in the client application list file; the first processing unit 703 adds a file in the object application list file which does not exist in the client application list file into an incremental file list when the file in the object application list file does not exist in the client application list file; the second processing unit 704 adds a file in the object application list file of which the hash value sha2 is different from the hash value sha2 of the file in the client application list file into the incremental file list when the hash value sha2 of the file in the object application list file is different from the hash value sha2 of the file in the client application list file; the compressing unit 705 packages and compresses the object application list file, a signature file of the object application list file and the file in the incremental file list to create an incremental upgrade package such that the client can upgrade the application package through the incremental upgrade package. The embodiment of the invention avoids fabricating illegal files with the same hash value through hash attack by adopting more secure hash algorithm; and avoids fabricating upgrade of the application by packaging and compressing the file, and signing and authenticating the application list file, thereby assuring safe transmission of the data and accelerating the update of the application.

Figure 8:
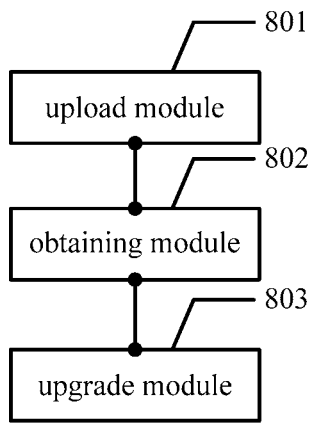
FIG. 8 is a structural schematic view of one embodiment of a client provided by the present invention.

Please refer to FIG. 8, the client provided by the invention according to an embodiment includes:

an upload module 801 configured to upload a client application list file to the server, wherein, the client application list file includes a file in an application package of the client and hash information of the file;

an obtaining module 802 configured to obtain an incremental upgrade package created by the server which packages and compresses the object application list file, the signature file of the object application list file, and the files in the incremental file list; wherein the files in the incremental file list include: the file in the object application list file which does not exist in the client application list file and/or the file in the object application list file of which the hash value sha2 is different from the hash value sha2 of the file in the client application list file;

an upgrade module 803 configured to upgrade the application package based on the obtained incremental upgrade package.

In the embodiment of the invention, the upload module 801 uploads a client application list file to the server, wherein, the client application list file includes a file in an application package of the client and hash information of the file; the obtaining module 802 obtains an incremental upgrade package created by the server which packages and compresses the object application list file, the signature file of the object application list file, and the files in the incremental file list; wherein the files in the incremental file list include: the file in the object application list file which does not exist in the client application list file and/or the file in the object application list file of which the hash value sha2 is different from the hash value sha2 of the file in the client application list file; the upgrade module 803 upgrades the application package based on the obtained incremental upgrade package. The embodiment of the invention avoids fabricating illegal files with the identical hash value through hash attack by adopting more secure hash algorithm; and avoids fabricating the application upgrade file by packaging and compressing the file and signature verifying the application list file; thereby ensuring secure data transmission, at the same time, accelerating the update of application programs.

Figure 9:
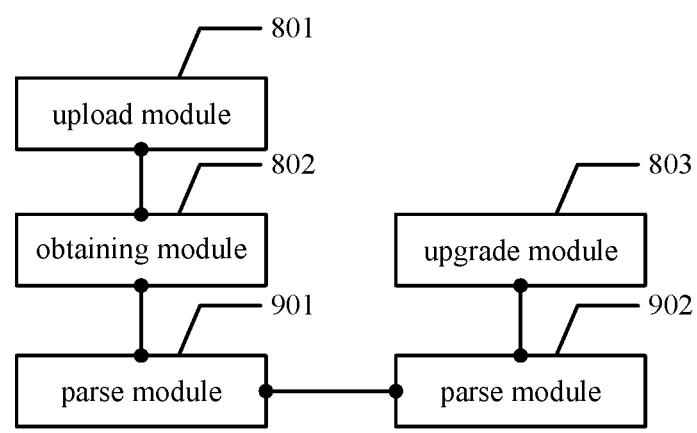
FIG. 9 is a structural schematic view of another embodiment of a client provided by the present invention.

Based on the client in the above mentioned embodiment, as shown in FIG. 9, said client optionally further includes:

a parse module 901 configured to parse and verify the incremental upgrade package;

a backup module 902 configured to back up the client application list file;

In the embodiment of the invention, the parse module 901 parses and verifies the incremental upgrade package; the backup module 902 backs up the client application list file, thereby avoiding attack from artificial illegal documents and improving the security and safety for upgrading an application program.

Figure 10:
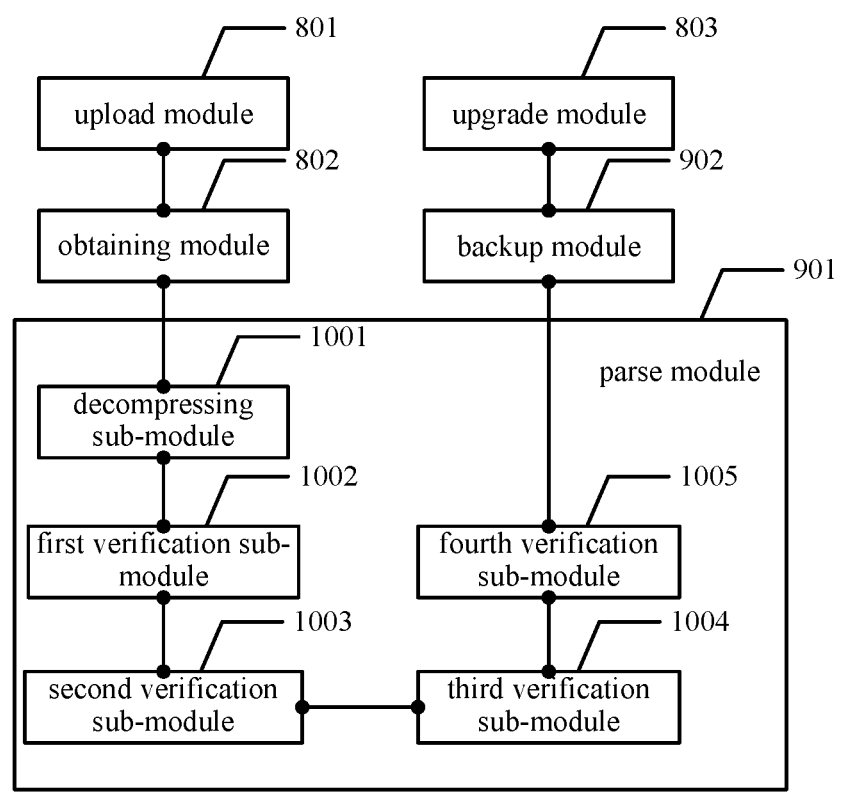
FIG. 10 is a structural schematic view of another embodiment of a client provided by the present invention.

Based on the client in the above mentioned embodiment, optionally, as shown in FIG. 10, the parse module 901 and specifically includes:

a decompressing sub-module 1001 configured to decompress the incremental upgrade package into a temporary upgrade dictionary;

a first verification sub-module 1002 configured to obtain the signature file of the object application list file, and verify whether the signature file of the object application list file is legal or not; if not, stopping upgrading and deleting the temporary upgrade dictionary;

a second verification sub-module 1003 configured to parse the object application list file, and verify whether the application name in the object application list file is matched; if not, stopping upgrading and deleting the temporary upgrade dictionary;

a third verification sub-module 1004 configured to verify whether the hash value sha2 of the file in the object application list file is identical to the hash value sha2 of the file in the client application list file or not; if not, stopping upgrading and deleting the temporary upgrade dictionary;

a fourth verification sub-module 1005 configured to verify whether the file in the object application list file exists in the incremental upgrade package, if not, stopping upgrading and deleting the temporary upgrade dictionary.

In the embodiment of the invention, the decompressing sub-module 1001 decompresses the incremental upgrade package into a temporary upgrade dictionary; the first verification sub-module 1002 obtains the signature file of the object application list file, and verifies whether the signature file of the object application list file is legal or not; if not, stopping upgrading and deleting the temporary upgrade dictionary; the second verification sub-module 1003 parses the object application list file, and verifies whether the application name in the object application list file is matched; if not, stopping upgrading and deleting the temporary upgrade dictionary; the third verification sub-module 1004 verifies whether the hash value sha2 of the file in the object application list file is identical to the hash value sha2 of the file in the client application list file or not; if not, stopping upgrading and deleting the temporary upgrade dictionary; the fourth verification sub-module 1005 verifies whether the file in the object application list file exists in the incremental upgrade package, if not, stopping upgrading and deleting the temporary upgrade dictionary, thereby avoiding fabricating illegal documents with identical hash value by hash attack and improving the security and safety for upgrading an application program.

Figure 11:
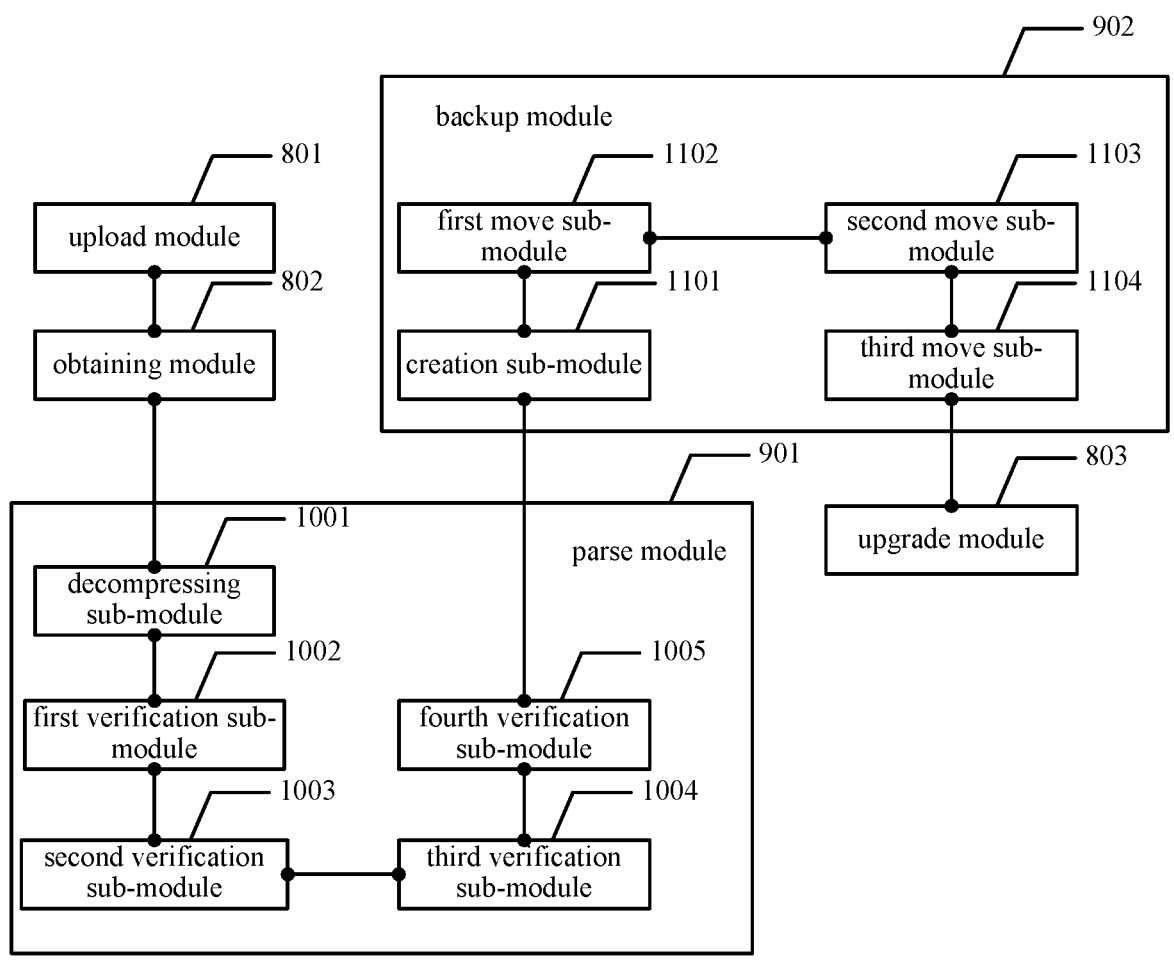
FIG. 11 is a structural schematic view of another embodiment of a client provided by the present invention.

Based on the client in the above mentioned embodiment, optionally, as shown in FIG. 11, said backup module 902 specifically includes:

a creation sub-module 1101 configured to create a temporary backup dictionary; a first move sub-module 1102 configured to move the file which exists in the client application list file but not in the object application list file into the temporary backup dictionary;

a second move sub-module 1103 configured to move the file which is in the client application list file and the hash value sha2 of the file is different from the hash value sha2 of the file in the object application list file into the temporary backup dictionary;

a third move sub-module 1104 configured to move the client application list file and the signature file of the client application list file into the temporary backup dictionary.

In the embodiment of the invention, the first move sub-module 1102 moves the file which exists in the client application list file but not in the object application list file into the temporary backup dictionary; the second move sub-module 1103 moves the file which is in the client application list file but the hash value sha2 of the file is different from the hash value sha2 of the file in the object application list file into the temporary backup dictionary; the third move sub-module 1104 moves the client application list file and the signature file of the client application list file into the temporary backup dictionary so as to avoid file loss due to following upgrade error which improves the security of the application upgrade.

Figure 12:
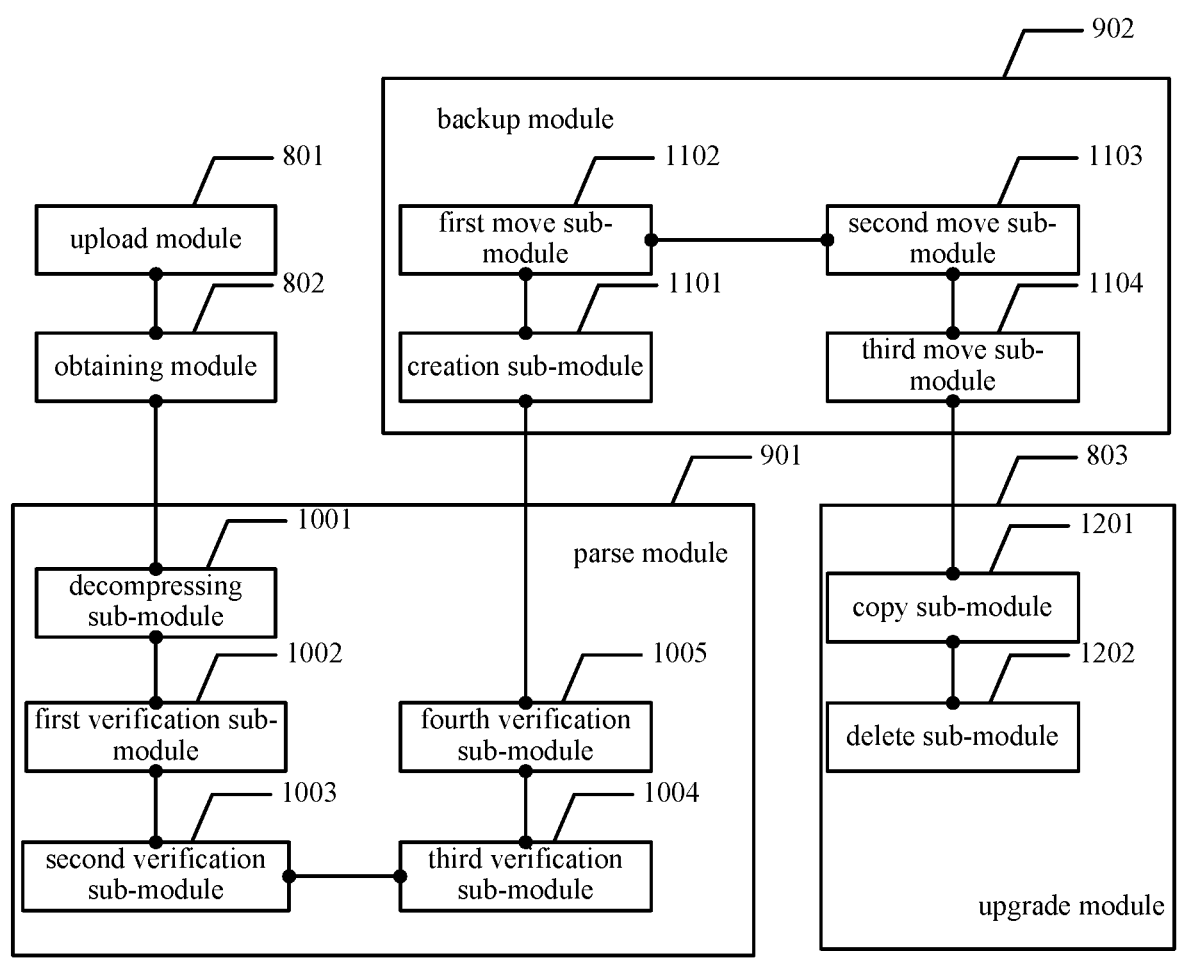
FIG. 12 is a structural schematic view of another embodiment of a client provided by the present invention.

Based on the client in the above mentioned embodiment, optionally, as shown in FIG. 12, said upgrade module 803 specifically includes:

a copy sub-module 1201 configured to copy the file in the temporary upgrade dictionary into an application dictionary;

a delete sub-module 1202 configured to delete the temporary upgrade dictionary and the temporary backup dictionary and inform the server that the upgrading task has been finished.

Figure 13:
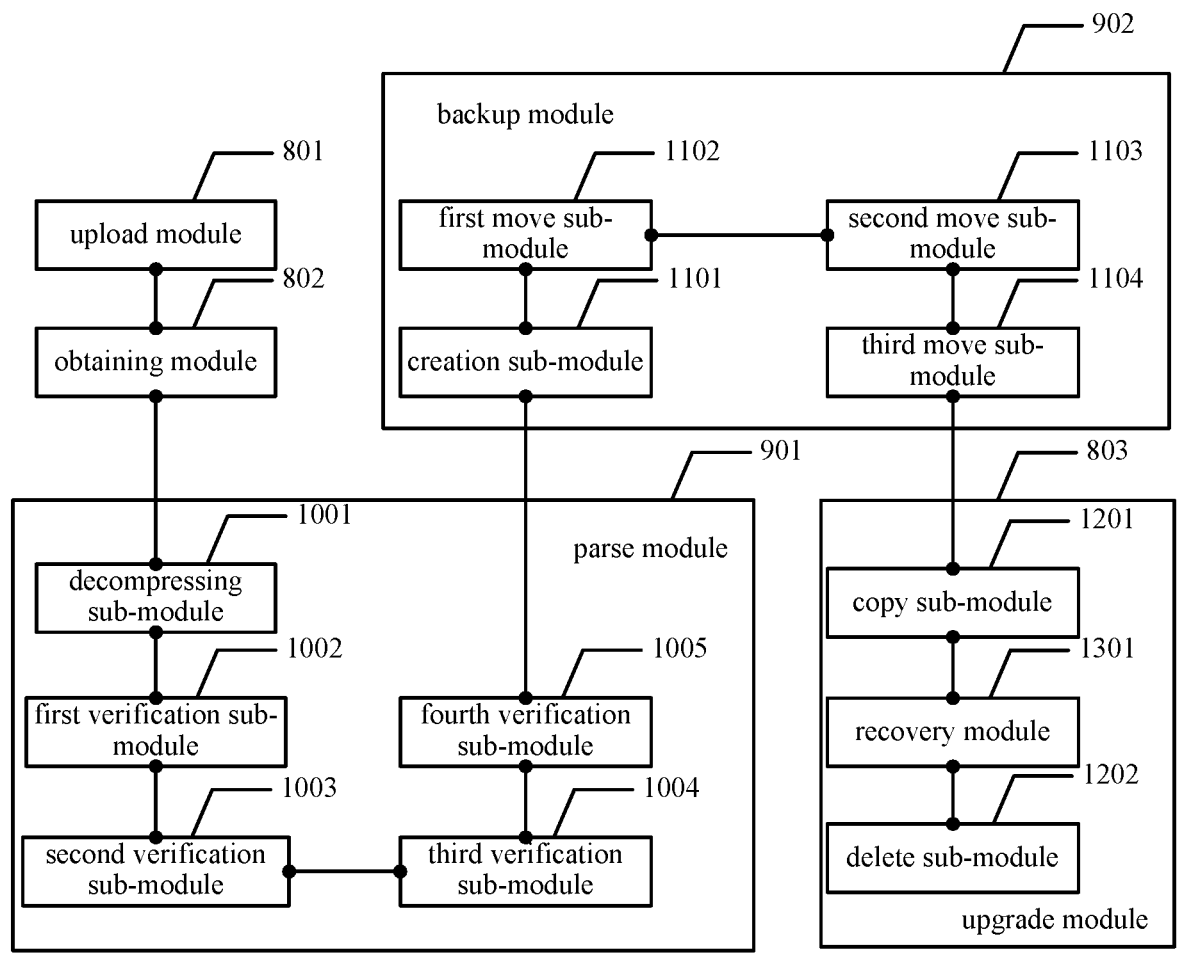
FIG. 13 is a structural schematic view of another embodiment of a client provided by the present invention.

Based on the client in the above mentioned embodiment, optionally, as shown in FIG. 13, said upgrade module 803 further includes:

a recovery module 1301 configured to recover the original file from the backup upgrade dictionary, delete the temporary upgrade dictionary, and inform the server that the upgrading task has been failed if an error happens when the copy sub-module 1021 copies.

In the embodiment of the invention, the recovery module 1301 recovers the original file from the temporary backup dictionary, deletes the temporary upgrade dictionary, and informs the server that the upgrading task has been failed if an error happens when the copy sub-module 1021 copies, thereby improving the reliability of the upgrade of the application.

It is to be clearly understood by those skilled in the art that for convenience and concision, the specific operation process of the described system, apparatus and unit can make reference to the correspondence process in the above mentioned method process, which are not repeated here.

It is to be understood that the disclosed systems, apparatuses and methods in some embodiments provided by the present application can also be achieved by other ways. For example, the described apparatus embodiments are merely schematic; as an example, the division of the units is merely a division based on logic function, whereas the units can be divided in other ways; for example, a multiple of units or components can be grouped or integrated into another system, or some features can be omitted or not executed.

Furthermore, the shown or discussed mutual coupling or direct coupling or communication connection is achieved by indirect coupling or communication connection of some interfaces, apparatuses or units in electric, mechanical or other ways.

The units described as isolated elements can be or not be separated physically; an element shown as a unit can be or not be physical unit, which means the element can be located in one location or at multiple network units. Some or the entire unit can be selected according to actual needs to achieve the purpose of the scheme of the embodiments.

Furthermore, each functional unit in each embodiment of the invention can be integrated into a processing unit, or each unit can exist in isolation, or two or more than two units can be integrated into one unit. The integrated unit can be achieved in hardware or in software function unit.

If the integrated unit is achieved in software functional unit and sold or used as a separated product, the integrated unit can be stored in a computer-readable storage medium. Based on this consideration, the substantial part, or the part that is contributed to the prior art of the technical solution of the invention, or part or all of the technical solutions of the invention can be embodied in a software product. The computer software product is stored in a storage medium, and includes several instructions configured to execute all or part of the method of each embodiment of the invention through a computer device (can be a personal computer, device, network device, and so on). The storage medium includes a U disk, a mobile hard disk, a read-only memory (ROM, Read-Only Memory), a random access memory (RAM, Random Access Memory), a disk or a light disk and other mediums in which program code can be stored.

The above embodiments are just for explaining the technical solutions of the present invention, but not intended for limitation; although detail description has been made to the present invention in reference to the above embodiments, those ordinarily skilled in the art should understand that modifications on the technical solutions recited in the embodiments, or equivalent replacements to part of the features can still be made; and the modifications and replacements do not make the substance of corresponding technical solutions depart from the spirit and scope of the technical solutions of each embodiment of the present invention.

What is claimed is:

1. A data transmitting method, comprising:
    by a server, obtaining a client application list file uploaded by a client,
        wherein the client application list file includes a file in an application package of the client and hash information of the file;
    by the server, determining whether a file in an object application list file exists in the client application list file;
    by the server, determining whether a hash value sha2 of the file in the object application list file is identical to a hash value sha2 of a file in the client application list file;
    by the server, adding the file in the object application list file which does not exist in the client application list file into an incremental file list when the file in the object application list file does not exist in the client application list file;
    by the server, adding a file in the object application list file of which the hash value sha2 is different from the hash value sha2 of the file in the client application list file into the incremental file list when the hash value sha2 of the file in the object application list file is different from the hash value sha2 of the file in the client application list file;
    by the server, packaging and compressing the object application list file, a signature file of the object application list file and files in the incremental file list to create an incremental upgrade package such that the client can upgrade the application package through the incremental upgrade package,
        wherein the object application list file includes a hash value of the file in the object application list file and the incremental file list includes a hash value of the file in the incremental file list.

2. A data transmitting method, comprising:
    by a client, uploading a client application list file to a server,
        wherein, the client application list file includes a file in an application package of the client and hash information of the file;
    by the client, obtaining an incremental upgrade package created by the server which packages and compresses an object application list file, a signature file of the object application list file, and files in an incremental file list,
        wherein the files in the incremental file list include at least one of:
            a file in the object application list file which does not exist in the client application list file, or
            a file in the object application list file of which the hash value sha2 is different from the hash value sha2 of the file in the client application list file,
        wherein the object application list file includes a hash value of a file in the object application list file and incremental file list includes a hash value of the file in the incremental file list;
    by the client, parsing and verifying the incremental upgrade package, wherein the parsing and verifying includes:
        obtaining the signature file of the object application list file,
        verifying whether the obtained signature file of the object application is legal, and
        verifying whether the hash value of the file in the object application list is identical to the hash value of the file in the client application list file; and
    by the client, upgrading the application package based on the parsing and verifying of the incremental upgrade package.

3. The method of claim 2, further comprising, after the obtaining an incremental upgrade package created by the server which packages and compresses the object application list file, the signature file of the object application list file, and the files in the incremental file list:
    by the client, parsing and verifying the incremental upgrade package;
    by the client, backing up the client application list file.

4. The method of claim 3, wherein the backing up the client application list file includes:
    by the client, creating a temporary backup dictionary;
    by the client, moving the file which exists in the client application list file but not in the object application list file into the temporary backup dictionary;
    by the client, moving the file which is in the client application list file but the hash value sha2 of the file is different from the hash value sha2 of the file in the object application list file into the temporary backup dictionary;

by the client, moving the client application list file and the signature file of the client application list file into the temporary backup dictionary.

5. The method of claim 4, wherein the upgrading of the application package based on the obtained incremental upgrade package includes:
by the client, copying the file in the temporary upgrade dictionary into an application dictionary,
by the client, informing the server that the upgrading task has been finished;
by the client, deleting the temporary upgrade dictionary and the temporary backup dictionary.

6. The method of claim 5, wherein the method further comprises, before the deleting of the temporary upgrade dictionary and the temporary backup dictionary:
by the client:
recovering an original file from the temporary backup dictionary,
deleting the temporary upgrade dictionary, and
informing the server that the upgrading task has failed when a copy error occurs.

7. The method of claim 2, wherein the parsing and verifying the incremental upgrade package further includes:
by the client, decompressing the incremental upgrade package into a temporary upgrade dictionary;
by the client, suspending an upgrade and deleting the temporary upgrade dictionary when the signature of the object application is not legal;
by the client:
parsing the object application list file,
verifying whether an application name in the object application list file is matched, and
stopping the upgrading and deleting the temporary upgrade dictionary when the application name in the object application list file is not matched;
by the client:
verifying whether the hash value sha2 of the file in the object application list file is identical to the hash value sha2 of the file in the client application list file or not, and
stopping the upgrading and deleting the temporary upgrade dictionary when the hash value sha2 of the file in the object application list file is not identical to the hash value sha2 of the file in the client application list file; and
by the client:
verifying whether the file in the object application list file exists in the incremental upgrade package, and
stopping upgrading and deleting the temporary upgrade dictionary when the file in the object application list file does not exist in the incremental upgrade package.

8. The method of claim 7, wherein the step of by the client, backing up the client application list file includes:
by the client, creating a temporary backup dictionary;
by the client, moving the file which exists in the client application list file but not in the object application list file into the temporary backup dictionary;
by the client, moving the file which is in the client application list file but the hash value sha2 of the file is different from the hash value sha2 of the file in the object application list file into the temporary backup dictionary;
by the client, moving the client application list file and the signature file of the client application list file into the temporary backup dictionary.

9. The method of claim 2, wherein the parsing and verifying of the incremental upgrade package further includes:
stopping upgrade when the signature file of the object application list file is not legal; and
stopping upgrading when the hash value of the file in the object application list file is not identical to the hash value of the file in the client application list file.

10. The method of claim 2, wherein the parsing and verifying of the incremental upgrade package further includes:
stopping upgrading when the file in the object application list file does not exist in the incremental upgrade package.

11. The method of claim 2, wherein the parsing and verifying of the incremental upgrade package further includes:
stopping upgrading when an application name in the object application list file is not matched.

12. A server, comprising:
a non-transitory storage medium, wherein the server is configured to execute a computer program stored in the storage medium in the form of a software function unit, the software function unit comprising:
an obtaining unit configured to obtain a client application list file uploaded by a client,
wherein the client application list file contains a file in the application package of the client and hash information of the file;
a decision unit configured to decide whether a file in the object application list file exists in the client application list file, and decide whether a hash value sha2 of the file in the object application list file is identical to a hash value sha2 of a file in the client application list file;
a first processing unit configured to add a file in the object application list file which does not exist in the client application list file into an incremental file list when the file in the object application list file does not exist in the client application list file;
a second processing unit configured to add a file in the object application list file of which the hash value sha2 is different from the hash value sha2 of the file in the client application list file into the incremental file list when the hash value sha2 of the file in the object application list file is different from the hash value sha2 of the file in the client application list file;
a compressing unit configured to package and compress the object application list file, a signature file of the object application list file and the file in the incremental file list to create an incremental upgrade package such that the client can upgrade the application package through the incremental upgrade package,
wherein the object application list file includes a hash value of the file in the object application list file and the incremental file list includes a hash value of the file in the incremental file list.

13. A client, comprising:
a non-transitory storage medium, wherein the server is configured to execute a computer program stored in the storage medium in the form of a software function unit, the software function unit comprising:
an upload module configured to upload a client application list file to a server, wherein the client application list file includes a file in an application package of the client and hash information of the file;
an obtaining module configured to obtain an incremental upgrade package created by the server which packages and compresses an object application list file, a signature file of the object application list file, and files in an incremental file list,
wherein the files in the incremental file list include at least one of:
a file in the object application list file which does not exist in the client application list file, or
a file in the object application list file of which the hash value sha2 is different from the hash value sha2 of the file in the client application list file,
wherein the object application list file includes a hash value of a file in the object application list file and the incremental file list includes a hash value of the file in the incremental file list; and
a parse module configured to parse and verify the incremental upgrade package, wherein the parse module includes:
a first verification sub-module configured to:
obtain the signature file of the object application list file, and
verify whether the signature file of the object application list file is legal or not; and
a third verification sub-module configured to verify whether the hash value of the file in the object application list file is identical to the hash value of the file in the client application list file; and
an upgrade module configured to upgrade the application package based on parsing and verification of the incremental upgrade package based on parsing and verification of the incremental upgrade package, by the first and the third verification sub-modules.

14. The client of claim 13, wherein the client further includes: the software function unit, which further comprises a backup module configured to back up the client application list file.

15. The client of claim 14, wherein the parse module further includes:
a decompressing sub-module configured to decompress the incremental upgrade package into a temporary upgrade dictionary;
a second verification sub-module configured to:
parse the object application list file,
verify whether the application name in the object application list file is matched, and
stopping upgrading and deleting the temporary upgrade dictionary when the application name in the object application list file is not matched;
wherein the third verification sub-module is further configured to stop upgrading and delete the temporary upgrade dictionary when the hash value sha2 of the file in the object application list file is not identical to the hash value sha2 of the file in the client application list file; and
a fourth verification sub-module configured to:
verify whether the file in the object application list file exists in the incremental upgrade package,
if not, stopping upgrading and deleting the temporary upgrade dictionary,
wherein the first verification sub-module is further configured to stop upgrading and delete the temporary upgrade dictionary when the signature file of the object application list file is not legal.

16. The client of claim 15, wherein the backup module includes:
a creation sub-module configured to create a temporary backup dictionary;
a first move sub-module configured to move a file which exists in the client application list file but not in the object application list file into the temporary backup dictionary;
a second move sub-module configured to move a file which is in the client application list file but the hash value sha2 of the file is different from the hash value sha2 of the file in the object application list file into the temporary backup dictionary;
a third move sub-module configured to move the client application list file and the signature file of the client application list file into the temporary backup dictionary.

17. The client of claim 14, wherein the backup module includes:
a creation sub-module configured to create a temporary backup dictionary;
a first move sub-module configured to move a file which exists in the client application list file but not in the object application list file into the temporary backup dictionary;
a second move sub-module configured to move a file which is in the client application list file but the hash value sha2 of the file is different from the hash value sha2 of the file in the object application list file into the temporary backup dictionary;
a third move sub-module configured to move the client application list file and the signature file of the client application list file into the temporary backup dictionary.

18. The client of claim 17, wherein the upgrade module includes:
a copy sub-module configured to copy the file in the temporary upgrade dictionary into an application dictionary;
a delete sub-module configured to delete the temporary upgrade dictionary and the temporary backup dictionary and inform the server that the upgrading task has been finished.

19. The client of claim 18, wherein the upgrade module further includes:
a recovery module configured to:
recover an original file from the backup upgrade dictionary,
delete the temporary upgrade dictionary, and
inform the server that the upgrading task has been failed if an error happens when the copy sub-module copies.

* * * * *